May 10, 1960   M. VIMIC   2,936,131
CINEMATOGRAPHIC CAMERA
Filed April 12, 1955   2 Sheets-Sheet 1

INVENTOR
MILORAD VIMIC
By Emery L. Groff
Attorney

May 10, 1960  M. VIMIC  2,936,131
CINEMATOGRAPHIC CAMERA
Filed April 12, 1955  2 Sheets-Sheet 2
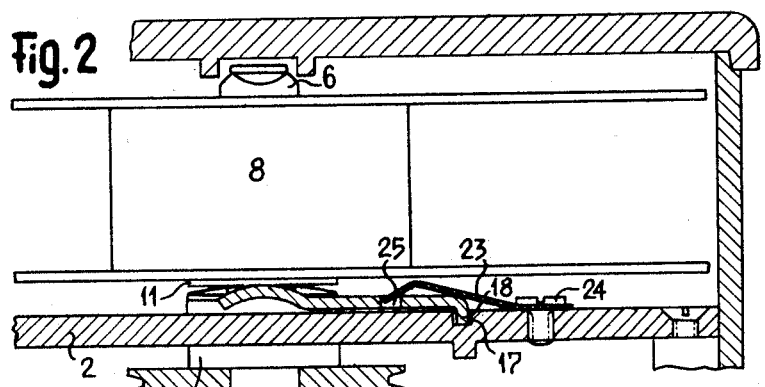
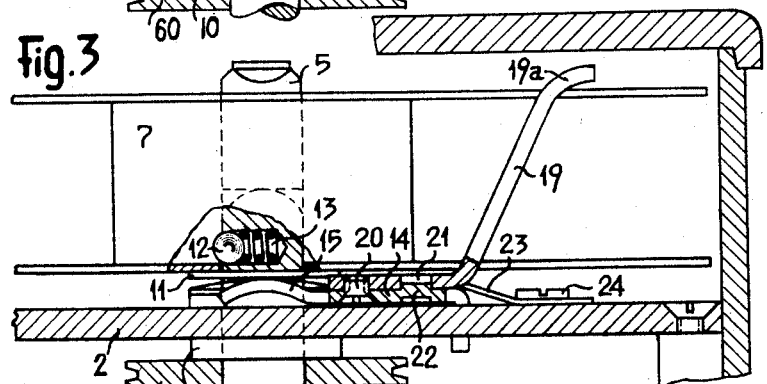
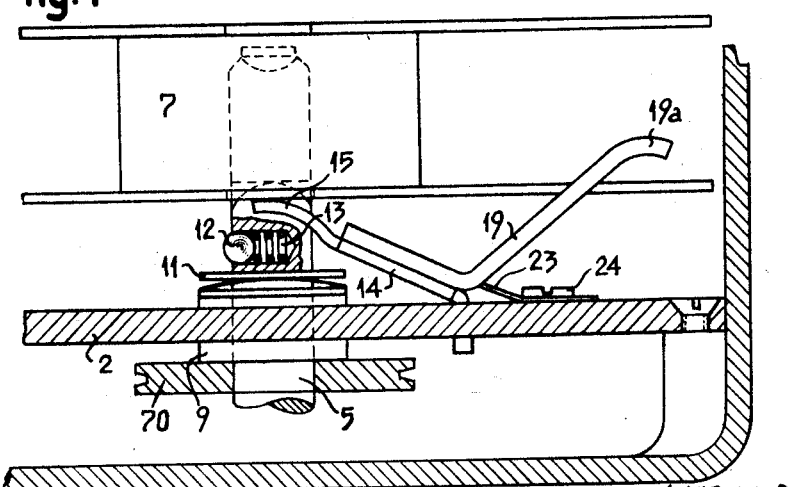
INVENTOR
MILORAD VIMIC
By Emery L. Groff
Attorney

2,936,131

CINEMATOGRAPHIC CAMERA

Milorad Vimic, Yverdon, Switzerland, assignor to Paillard S.A., Sainte-Croix, Switzerland, a corporation of Switzerland Application April 12, 1955, Serial No. 500,916

Claims priority, application Switzerland April 14, 1954

2 Claims. (Cl. 242—55.11)

In the construction of cinematographic cameras, especially those adapted for amateurs, the use of space should be very rational, in order to obtain cameras having a reduced overall size. This is the reason why, in the majority of known cameras, the space between the spools and the casing is not sufficiently large to enable the fingers of the hand to be introduced into the camera and to remove the spools easily. This inconvenience becomes greater in connection with cameras of which the spindles supporting the spools are fitted with a stop notch provided for preventing axial movement of the spools, in order to avoid certain causes of defective functioning and the noise which may result.

The present invention tends to remedy this disadvantage and has for its subject a cinematographic camera with spools, which is distinguished from known cameras by the fact that it is provided with a device for ejecting the spools.

One form of construction of a camera according to the invention is shown diagrammatically and by way of example in the accompanying drawings, wherein:

Figs. 2 and 3 are sections on the lines II—II, and III—III respectively, of Fig. 1.

Fig. 4 is a partial diagrammatic and sectional view of the ejector device and a spool in their respective positions during an ejecting movement.

Figure 1:
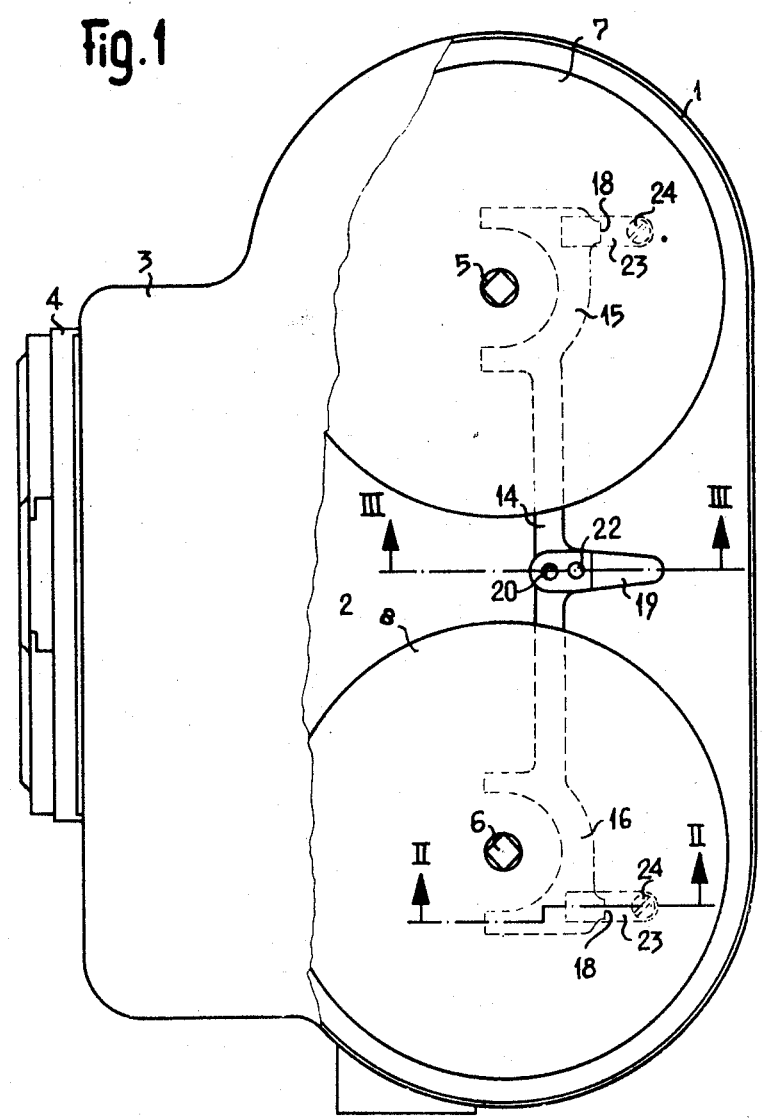
Figure 1 is a side elevational view of the camera of my invention with portions broken away showing diagrammatically the spools in operative position together with the ejector device.

The cinematographic camera shown in Fig. 1 comprises, in the usual manner, a partition casing 1, a plate 2 carrying the motor mechanism of the camera, said plate being attached to the casing by a screw and flange arrangement as diagrammatically shown in Figures 2, 3 and 4, and as well known in the art, a cover 3 and a turret 4 adapted to receive the objectives. It also comprises two spindles 5 and 6 adapted to drive a flanged take-off spool 7 and a flanged winding spool 8 respectively. Each of the said spindles is driven in rotation by the motor mechanism (not shown) including a motor operatively associated with pulleys 60 and 70 through belts (not shown) to constitute a driving means well known in the art for the camera. Said spindles 5 and 6 are mounted in a bearing 9, 10, respectively, secured in the said plate 2.

On a portion of its length, each of said spindles 5 and 6 has a rectangular shaft adapted to engage in a central opening of the lower flange of the corresponding spool so as to secure said latter angularly to the spindle for the purpose of its drive. Each of the spindles is also provided with a projection 11 against which the said lower flange of the spool bears.

A stop member is provided on each of the spindles 5 and 6. It is formed by a ball 12 lodged in each of the said spindles 5 and 6 and is subjected to the action of a spring 13 tending to maintain the ball 12 projecting from the respective spindle 5 or 6. Said stop member is provided for maintaining each spool in its engaged position whilst preventing it from moving axially whilst it is being driven in rotation by the motor mechanism.

The ejector device comprises a rod 14 having at each of its ends a fork 15, 16 respectively. Said rod is located on the plate 2 in such a manner that the two limbs of each fork engage the lower flange of each of the respective spools at points thereof oppositely positioned with respect to each of the spindles 5 and 6, as is clearly shown in the drawing.

The plate 2 comprises two seating indentations 17 adapted to receive integral lugs 18 provided at each of the ends of the rod 14. A bent arm 19 is secured to the middle portion of the rod 14 by means of a screw 20. The arm 19 is provided with a hole 21 with which engages a projection 22 of the rod 14, in such a manner as to prevent the said arm turning about its fixing point. The rod 14 is held pressed against the plate 2 by two blade springs 23. One of the ends of each of the latter is secured to the plate 2, by means of a screw 24, the other being folded in such a manner as to engage with a hole 25 provided near each of the ends of the rod 14.

Said lugs 18 co-operate with seatings 17 forming a type of hinge for the rod 14, enabling the latter to rock against the action of springs 23 along an axis parallel to the rod and passing through the end of the lugs 18. The ejector device described above operates in the following manner:

During the operation of the camera, the spools 7 and 8 occupy the position shown in Figs. 2 and 3. The lower flange of each spool bears against the projection 11 of the respective spindle and is held there by the ball 12.

When it is desired to remove the spools 7 and 8 from their respective spindles 5 and 6, pressure is applied to the bent end 19a of the arm 19, in such a manner as to cause the rod 14 to rock about the geometrical axis connecting the ends of the lugs 18, against the action of springs 23. The two limbs of each of the forks 15 and 16, apply a thrust against the lower flange of the corresponding spool, lifting said latter, against the action of the ball 12, to a height enabling it to be gripped easily by the hand and withdrawn from the camera. When the arm 19 is released, the rod 14 is returned to the normal position against the plate 2 by the action of springs 23.

As will be seen from the foregoing description, the ejector device for the spools described considerably facilitates the manipulation of the camera and is therefore of considerable advantage for this.

It will be understood that numerous modifications may be applied to the construction of the ejector device described. Thus, for example, the arm 19 and the rod 14 may be formed as a single part. The lugs 18, on the other hand, may be replaced by lugs provided on the rod 14 in planes perpendicular to said longitudinally positioned rod, said lugs being pierced so as to be engaged on a spindle generally parallel to the rod 14 secured to the plate 2.

It will be understood that the rod 14 may be hinged to the plate by means of any other suitable hinge device.

I claim:

1. A cinematographic camera, comprising, in combination, a casing, a cover adapted to be secured to said casing, a plate member positioned within said casing, whereby said plate member forms a partition wall in said casing, a pair of spindle members rotatably mounted in said plate member partition wall, said spindles being spaced from each other and extending through said plate member partition wall towards said cover and terminating at points between and away from said cover and said plate member partion wall, a take-off spool having upper and lower flanges movably mounted on one of said spindles, a winding spool having upper and lower flanges movably mounted on the other of said spindles, whereby said spools are mounted independently of said cover, means for rotating said spindles, means for preventing axial movement of said spools while said spindles are rotating, said means being positioned in each of said spindles, said spindle rotating means being operatively connected to said spindles, and means for directly engaging and for simultaneously ejecting said spools, said ejecting means being secured, in part, to said plate member partition wall and engaging said spools at their respective lower flanges and being positioned entirely away from and independently of said cover, whereby the spools and the film will be completely protected within the casing, and whereby the spools can be easily removed from the casing.

2. A cinematographic camera, comprising, in combination, a casing, a cover adapted to be secured to said casing, a plate member positioned within said casing, whereby said plate member forms a partition wall in said casing, a pair of spindle members rotatably mounted in said plate member partition wall, said spindles being spaced from each other and extending through said plate member partition wall towards said cover and terminating at points between and away from said cover and said plate member partition wall, a take-off spool having upper and lower flanges movably mounted on one of said spindles, a winding spool having upper and lower flanges movably mounted on the other of said spindles, whereby said spools are mounted independently of said cover, means for rotating said spindles, means for preventing axial movement of said spools while said spindles are rotating, said means being positioned in each of said spindles, said spindle rotating means being operatively connected to said spindles, and means for directly engaging and for simultaneously ejecting said spools, said ejector means being positioned entirely away from and independently of said cover, said means for directly engaging and for simultaneously ejecting said spools including a rod member positioned between the plane of the lower spool flanges and the plate member partition wall and on a plane substantially parallel to the plane of a straight line passing between the two spindles, a fork member connected to said rod at one end thereof for engagement with the lower flanges of the take-off spool, a fork member connected to said rod at one end thereof for engagement with the lower flange of the winding spool, each of said fork members having limb members, an operating arm member secured to said rod member at the central portion thereof, spring means for urging said rod against said plate member partition wall, said spring means being secured to said plate member partition wall and to said rod member, said rod having lugs connected thereto at the respective ends thereof, said plate member partition wall having seating means for receiving said lugs whereby application of pressure on said arm causes said rod to rock about an axis parallel to itself and against the said spring means thereby producing a thrust of said fork members against the spools at the lower flanges thereof to disengage said spools from their spindles, and whereby the film will be completely protected within the casing.

References Cited in the file of this patent

UNITED STATES PATENTS

| | | |
|---|---|---|
| 663,675 | Diehl et al. | Dec. 11, 1900 |
| 1,955,691 | Swanson | Apr. 17, 1934 |
| 2,110,484 | Hopkins | Mar. 8, 1938 |
| 2,133,743 | Githens et al. | Oct. 18, 1938 |
| 2,226,152 | Babcock | Dec. 24, 1940 |
| 2,357,076 | Briskin et al. | Aug. 29, 1944 |
| 2,493,657 | Dale | Jan. 3, 1950 |
| 2,572,596 | Camras | Oct. 23, 1951 |
| 2,652,988 | Godeck | Sept. 22, 1953 |